US008867658B2

(12) United States Patent
Imamura et al.

(10) Patent No.: US 8,867,658 B2
(45) Date of Patent: Oct. 21, 2014

(54) MULTICARRIER-SIGNAL RECEIVING APPARATUS AND MULTICARRIER-SIGNAL TRANSMITTING APPARATUS

(71) Applicant: Sharp Kabushiki Kaisha, Osaka (JP)

(72) Inventors: Kimihiko Imamura, Vancouver, WA (US); Yasuhiro Hamaguchi, Ichihara (JP); Yasuyuki Kato, Chiba (JP); Daiichiro Nakashima, Chiba (JP)

(73) Assignee: Sharp Kabushiki Kaisha

( * ) Notice: Subject to any disclaimer, the term of this patent is extended or adjusted under 35 U.S.C. 154(b) by 0 days.

(21) Appl. No.: 14/248,224

(22) Filed: Apr. 8, 2014

(65) Prior Publication Data
US 2014/0219390 A1 Aug. 7, 2014

Related U.S. Application Data

(60) Continuation of application No. 13/949,065, filed on Jul. 23, 2013, now Pat. No. 8,731,103, which is a continuation of application No. 13/753,215, filed on Jan. 29, 2013, now Pat. No. 8,514,970, which is a division of application No. 12/374,249, filed as application No. PCT/JP2007/064257 on Jul. 19, 2007, now Pat. No. 8,396,165.

(30) Foreign Application Priority Data

Jul. 20, 2006 (JP) .................................. 2006-198095

(51) Int. Cl.
*H04L 27/36* (2006.01)
*H04L 1/00* (2006.01)
*H04L 25/02* (2006.01)
*H04L 27/26* (2006.01)
*H04B 7/06* (2006.01)
*H04L 5/00* (2006.01)

(52) U.S. Cl.
CPC .......... *H04L 1/0042* (2013.01); *H04L 25/0204* (2013.01); *H04L 25/0232* (2013.01); *H04L 27/2647* (2013.01); *H04L 1/0033* (2013.01); *H04L 25/022* (2013.01); *H04B 7/0671* (2013.01); *H04L 5/0044* (2013.01); *H04L 27/2626* (2013.01)
USPC ......................................................... 375/295

(58) Field of Classification Search
USPC ................. 375/260, 267, 295, 296, 299, 371; 455/99, 101; 370/203, 208, 210
See application file for complete search history.

(56) References Cited

U.S. PATENT DOCUMENTS 7,058,002 B1   6/2006   Kumagai et al.
7,646,820 B2   1/2010   Shen et al.
(Continued)

FOREIGN PATENT DOCUMENTS

JP   2005-341056 A   12/2005
JP   2007-243913 A   9/2007

OTHER PUBLICATIONS

Auer, G., "Channel Estimation by Set Partitioning for OFDM with Cyclic Delay Diversity", IEEE Vehicular Technology Conference, 2004, VCT-2004-Fall, vol. 1, Sep. 2004, pp. 669-673.

(Continued)

*Primary Examiner* — Tesfaldet Bocure
(74) *Attorney, Agent, or Firm* — Birch, Stewart, Kolasch & Birch, LLP

(57) ABSTRACT

A multicarrier signal transmitting apparatus includes a rotation amount setting unit and a phase rotator. The rotation amount setting unit sets a phase rotation amount for each subcarrier of a plurality of subcarrier groups, where the phase rotation amount being set with a setting selected from a first setting being that the phase rotation amount is set for a first subcarrier group set which includes a plurality of continuous subcarrier groups and a second setting being that the phase rotation amount is set for a second subcarrier group set which includes a plurality of continuous subcarrier groups, where the number of the continuous subcarrier groups included in the first subcarrier group set is different from the number of the continuous subcarrier groups included in the second subcarrier group set. The phase rotator adds, based on the phase rotation amount, a phase rotation to reference signals and a data signal of each subcarrier of the plurality of subcarrier groups.

6 Claims, 13 Drawing Sheets

(56) References Cited

U.S. PATENT DOCUMENTS

| | | |
|---|---|---|
| 7,873,117 B2 | 1/2011 | Fukuoka et al. |
| 2006/0274854 A1 | 12/2006 | Matsumoto et al. |
| 2006/0285599 A1 | 12/2006 | Seki et al. |
| 2008/0080628 A1 | 4/2008 | To et al. |
| 2009/0316833 A1 | 12/2009 | Yamaguchi et al. |

OTHER PUBLICATIONS

Kawauchi et al., Application of Cyclic Delay Transmit Diversity to DS-CDMA Using Frequency-Domain Equalization,' Technical Report of IEICE, vol. 104, No. 677 (A-P2004-305), 2005, pp. 13-18.

Sharp, "Improved Performance of the Cyclic Shift Diversity Scheme in the E-UTRA Downlink", 3GPP TSG RAN WG1, Meeting #46, R1-062255, <URL:http://www.3gpp.org/ftp/tsp_ran/WG1_RL1/TSGR1_46/Docs/R1-062255.zip>, pp. 1-6, Tallinn, Estonia, Aug. 28-Sep. 1, 2006.

Sharp, "Performance Comparison between the Conventional CCD and a Sub-carrier Grouping CDD scheme for the common control channel", #3GPP TSG-RAN WG1, Meeting #47bis, R1-070218, 2007.01, Internet <URL:http://www.3gpp.org/ftp/tsg_ran/WG1_RL1/TSGR1_47bis/Docs/R1-070218.zip>, pp. 1-11, Sorrento, Italy, Jan. 15-20, 2007.

G. Auer "Channel estimation for OFDM with cyclic delay diversity", Proc. IEEE Int. Symp. Pers., Indoor and Mobile Radio Commun., 2004 vol. 3 pp. 1792-1796, Sep. 2004.

Auer, G., "Channel Estimation by Set Partitioning for OFDM with Cyclic Delay Diversity", IEEE Vehicular Technology Conference, 2004, VTC-2004-Fall, vol. 1, Sep. 2004, pp. 669-673.

Kawauchi et al., Application of Cyclic Delay Transmit Diversity to DS-CDMA Using Frequency-Domain Equalization, Technical Report of IEICE, vol. 104, No. 677 (A-P2004-305), 2005, pp. 13-18.

NTT DoCoMo, "Multi-Degree Cyclic Delay Diversity with Frequency-domain Channel Dependent Scheduling", #3GPP TSG-RAN WG1 Meeting #44bis, R1-060991, pp. 1-5, Mar. 2006, Internet <URL:http://www.3gpp.org/ftp/tsg_ran/WG1_RL1/TSGR1_44bis/Docs/R1-060991.zip>.

Sharp, "Improved Performance of the Cyclic Shift Diversity Scheme in the E-UTRA Downlink", 3GPP TSG RAN WG1, Meeting #46, R1-062255, <URL:http://www.3gpp.org/ftp/tsg_ran/WG1_RL1/TSGR1_46/Docs/R1-062255.zip>, pp. 1-6, Tallinn, Estonia Aug. 28-Sep. 1, 2006.

Sharp, "Performance Comparison between the Conventional CDD and a Sub-carrier Grouping CDD scheme for the common control channel", #3GPP TSG-RAN WG1, Meeting #47bis, R1-070218, 2007.01, Internet <URL:http://www.3gpp.org/ftp/tsg_ran/VVG1_RL1/TSGR1_47bis/Docs/R1-070218.zip>, pp. 1-11, Sorrento, Italy, Jan. 15-20, 2007.

Toshiba Corporation, NTT DoCoMo, "Further Study on Reference Signal Structure for MBMS", TSG-RAN WG1 AH, R1-061855, pp. 1-8, Cannes, France, Jun. 27-30, 2006.

U.S. Notice of Allowance issued in U.S. Appl. No. 12/374,249 on Nov. 5, 2012.

U.S. Notice of Allowance issued in U.S. Appl. No. 13/753,215 on Apr. 17, 2013.

U.S. Notice of Allowance issued in U.S. Appl. No. 13/949,065 on Jan. 9, 2014.

U.S. Office Action issued in U.S. Appl. No. 12/374,249 on Jun. 29, 2012.

U.S. Office Action issued in U.S. Appl. No. 13/949,065 on Sep. 13, 2013.

International Search Report issued in International Patent Application No. PCT/JP2007/064257 on Oct. 2, 2007.

MULTICARRIER-SIGNAL RECEIVING APPARATUS AND MULTICARRIER-SIGNAL TRANSMITTING APPARATUS

This application is a Continuation of application Ser. No. 13/949,065, filed on Jul. 23, 2013, now issued as U.S. Pat. No. 8,731,103 on May 20, 2014, which is a Continuation of application Ser. No. 13/753,215, filed on Jan. 29, 2013, now issued as U.S. Pat. No. 8,514,970 on Aug. 20, 2013 which is a Divisional of application Ser. No. 12/374,249, filed on Jan. 16, 2009, now issued as U.S. Pat. No. 8,396,165 on Mar. 12, 2013 the entire contents of which are hereby incorporated by reference and for which priority is claimed under 35 U.S.C. §120. Application Ser. No. 12/374,249 is the national phase of PCT International Application No. PCT/JP2007/064257 filed on Jul. 19, 2007, under 35 U.S.C. §371, which claims priority under 35 U.S.C. 119(a) to Patent Application No. JP 2006-198095 filed in Japan on Jul. 20, 2006. The entire contents of each of the above-identified applications are hereby incorporated by reference.

TECHNICAL FIELD

The present invention relates to a multicarrier-signal receiving apparatus and a multicarrier-signal transmitting apparatus, and particularly to a multicarrier-signal receiving apparatus and a multicarrier-signal transmitting apparatus that utilize cyclic delay transmit diversity.

Priority is claimed on Japanese Patent Application No. 2006-198095, filed on July 20, 2006, the content of which is incorporated herein by reference.

BACKGROUND ART

Recently, multicarrier transmissions utilizing CDTD (Cyclic Delay Transmit Diversity) have been proposed in which a multicarrier-signal transmitting apparatus including multiple transmission antennas adds different cyclic delays to transmission signals to be simultaneously transmitted from the transmission antennas (see Non-patent Document 1). When CDTD is used, the channel frequency selectivity always increases, thereby preventing the reception power from decreasing over the entire frequency of a reception channel, and achieving excellent average BER (Bit Error Rate) characteristics in a receiving apparatus.

FIG. 11 shows a case where a signal is transmitted from transmission antennas 1a and 1b included in a multicarrier-signal transmitting apparatus to a reception antenna 2a included in a multicarrier-signal receiving apparatus. As shown in FIG. 11, signals s1 and s2 are respectively transmitted from the transmission antennas 1a and 1b, and a multiplexed wave thereof is received by the reception antenna 2a. The multicarrier-signal transmitting apparatus utilizing CDTD adds different cyclic delays to the signals s1 and s2 to be respectively transmitted from the transmission antennas 1a and 1b.

FIG. 12 shows the configuration and the power of the reception signal.

FIG. 12 (a) shows an example state of subcarriers and OFDM symbols being respectively arranged along the horizontal and the vertical axes representing frequency and time. As shown in FIG. 12, channel estimation symbols P1 to P5 are arranged at every 6 subcarriers.

FIG. 12 (b) shows a state of the reception signal being distorted in the frequency domains with respect to the power where the vertical and the horizontal axes represent frequency and power. When a transmission apparatus uses CDTD, the frequency selectivity increases as shown in FIG. 12 (b). Therefore, enhancement of the reception characteristics can be expected.

Non-patent Document 1: IEICE technical report RCS2004-392, "Application of Cyclic Delay Transmit Diversity to DS-CDMA using Frequency-domain Equalization", issued on March, 2005 by the Institute of Electronics, Information and Communication Engineers.

DISCLOSURE OF THE INVENTION

Problems to be Solved by the Invention

Since the frequency selectivity increases in the multicarrier transmission method using CDTD, channel estimation errors occur upon channel response estimation for subcarriers at which no channel estimation symbol is arranged when channel estimation symbols separately arranged in the frequency direction are used, thereby degrading the reception characteristics.

Means for Solving the Problems

A multicarrier-signal receiving apparatus according to one aspect of the present invention may include: a Fourier-transformer that performs a Fourier transform on reception signals to extract subcarriers; a channel estimator that performs channel estimation on one of the extracted subcarriers using channel estimation symbols included in a subcarrier group to which the one of the extracted subcarriers belongs, the subcarrier group including subcarriers to which an identical phase rotation is added upon transmission; and a channel compensator that performs channel compensation on data symbols included in the one of the extracted subcarriers using a result of the channel estimation performed by the channel estimator on the one of the extracted subcarriers.

As a result, different phase rotation amounts are added to subcarrier groups each including the adequate number of subcarriers upon transmission. Thereby, the multicarrier-signal receiving apparatus can perform channel estimation with the frequency selectivity being increased and the channel estimation errors being suppressed. Therefore, enhancement of the reception characteristics can be expected.

The multicarrier-signal receiving apparatus may further include a controller that gives, to the channel estimator, an instruction on a channel estimating method according to a resource block to which the one of the extracted subcarriers belongs, the resource block being a unit of demodulation processing in frequency and time directions.

In multicarrier-signal receiving apparatus, the channel estimator may select, for the channel estimation to be performed on the one of the extracted subcarriers, whether to use channel-estimation symbols included in the subcarrier group to which the one of the extracted subcarriers belongs or to use channel-estimation symbols included in a plurality of subcarrier groups including the subcarrier group to which the one of the extracted subcarriers belongs, based on the instruction given by the controller, and perform the channel estimation based on the selection.

As a result, the multicarrier-signal receiving apparatus can set a range of channel estimation symbols that the channel estimator uses for channel estimation to a range including close channel response values based on a resource block in which different phase rotation amounts are added to subcarrier groups upon transmission or a resource block in which the same phase rotation amount is added thereto. Therefore, the multicarrier-signal receiving apparatus can perform channel estimation with channel estimation errors being suppressed.

In the multicarrier-signal receiving apparatus, the controller gives, to the channel estimator, an instruction on a channel estimating method according to a physical channel included in the resource block.

As a result, the multicarrier-signal receiving apparatus can set a range of channel estimation symbols that the channel estimator uses for channel estimation to a range including close channel response values based on whether or not a resource block includes a particular physical channel in which different phase rotation amounts are added to subcarrier groups upon transmission. Therefore, the multicarrier-signal receiving apparatus can perform channel estimation with channel estimation errors being suppressed.

In the multicarrier-signal receiving apparatus, the controller gives, to the channel estimator, an instruction on a channel estimating method according to a transport channel included in the resource block.

As a result, the multicarrier-signal receiving apparatus can set a range of channel estimation symbols that the channel estimator uses for channel estimation to a range including close channel response values based on whether or not a resource block includes a particular transport channel in which different phase rotation amounts are added to subcarrier groups upon transmission. Therefore, the multicarrier-signal receiving apparatus can perform channel estimation with channel estimation errors being suppressed.

In the multicarrier-signal receiving apparatus, the controller gives, to the channel estimator, an instruction on a channel estimating method according to a logical channel included in the resource block.

As a result, the multicarrier-signal receiving apparatus can set a range of channel estimation symbols that the channel estimator uses for channel estimation to a range including close channel response values based on whether or not a resource block includes a particular logical channel in which different phase rotation amounts are added to subcarrier groups upon a transmission. Therefore, the multicarrier-signal receiving apparatus can perform channel estimation with channel estimation errors being suppressed.

In the multicarrier-signal receiving apparatus, the channel estimator averages results of channel estimation performed using the channel-estimation symbols, and regards the averaged result as the result of the channel estimation on the one of the extracted subcarriers.

In the multicarrier-signal receiving apparatus, the channel estimator linearly interpolates results of channel estimation performed using the channel-estimation symbols, and regards the averaged result as the result of the channel estimation on the one of the extracted subcarriers.

A multicarrier-signal receiving apparatus according to another aspect of the present invention may include: a Fourier-transformer that performs Fourier transform on reception signals to extract a subcarrier; a channel estimator that performs channel estimation on the extracted subcarrier using a channel estimation symbol included in a subchannel other than that to which the extracted subcarrier belongs, the subchannel being a unit of demodulation processing in a frequency direction; and a channel compensator that performs channel compensation on data symbols included in the extracted subcarrier using a result of the channel estimation performed on the extracted subcarrier including the data symbols.

A multicarrier-signal receiving apparatus according to another aspect of the present invention may include: a Fourier-transformer that performs Fourier transform on reception signals to extract a subcarrier; a channel estimator that performs channel estimation on the extracted subcarrier using channel estimation symbols included in subcarrier groups included in a subchannel to which the extracted subcarrier belongs, each of the subcarrier groups including subcarriers to which an identical phase rotation is added, and the subchannel being a unit of demodulation processing in a frequency direction; and a channel compensator that performs channel compensation on data symbols included in the extracted subcarrier using a result of the channel estimation performed on the extracted subcarrier including the data symbols.

A multicarrier-signal transmitting apparatus according to another aspect of the present invention may include: a rotation-amount setting unit that sets thereto a phase rotation amount for each subcarrier; and a phase rotator that adds a phase rotation based on the set phase rotation amount to a data signal of each subcarrier. The set phase rotation amount is identical for each subcarrier group including a plurality of subcarriers, and a phase rotation amount difference among adjacent subcarrier groups included in a resource block is determined according to the resource block that is a unit of demodulation processing in frequency and time directions performed by a receiving apparatus.

As a result, the multicarrier-signal transmitting apparatus can select to use or not to use cyclic delay transmit diversity with the same phase rotation amounts being added to each subcarrier group for precise channel estimation upon reception.

Effects of the Invention

Since different phase rotation amounts are added to subcarrier groups each including the adequate number of subcarriers upon transmission, the multicarrier-signal receiving apparatus of the present invention can perform channel estimation with the frequency selectivity being increased and the channel estimation errors being suppressed. Therefore, enhancement of the reception characteristics can be expected.

Figure 1:
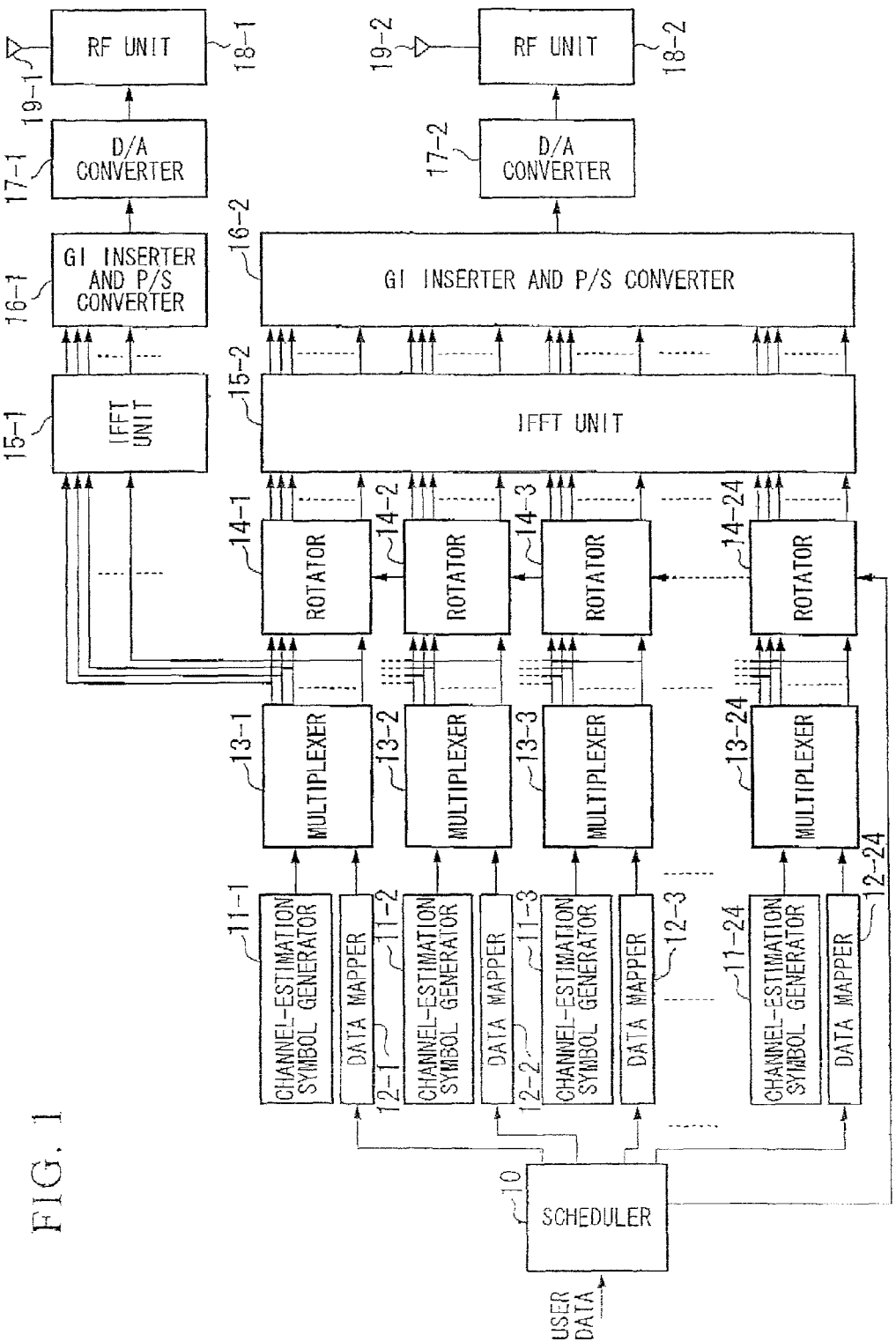
FIG. 1 is a schematic block diagram showing the configuration of a multicarrier-signal transmitting apparatus according to a first embodiment of the present invention.

DESCRIPTIONS OF REFERENCE NUMERALS 10 scheduler
11-1 to 11-24 channel-estimation symbol generator
12-1 to 12-24 data mapper
13-1 to 13-24 multiplexer
14-1 to 14-24 rotator
15-1 and 15-2 IFFT unit
16-1 and 16-2 GI inserter and P/S convertor
17-1 and 17-2 D/A convertor
18-1 and 18-2 RF unit
19-1 and 19-2 transmission antenna
20a and 20b rotation-amount setting unit
21-1a to 21-25b complex multiplier
30 reception antenna
31 RF unit
32 A/D convertor
33 symbol synchronizer
34 FFT unit
35 controller
36 channel compensator
37 channel estimator
38 subchannel extractor
39 demodulator

BEST MODE FOR CARRYING OUT THE INVENTION

First Embodiment

Hereinafter, a first embodiment of the present invention is explained with reference to the accompanying drawings. In the first embodiment, user data is transmitted while signals in each subcarrier group are added a given phase rotation by a multicarrier-signal transmitting apparatus. A multicarrier-signal receiving apparatus performs interpolation, such as averaging or linear interpolation, on channel estimation values in each subcarrier group, and thereby acquires a channel estimation result for a subcarrier by which a channel estimation symbol is not transmitted. The multicarrier-signal receiving apparatus performs demodulation after performing a channel compensation using the channel estimation result to acquire the transmitted user data.

FIG. 1 is a schematic block diagram showing the configuration of a multicarrier-signal transmitting apparatus according to the first embodiment of the present invention. The multicarrier-signal transmitting apparatus includes a scheduler 10, channel-estimation symbol generators 11-1 to 11-24, data mappers 12-1 to 12-24, multiplexers 13-1 to 13-24, rotators 14-1 to 14-24, IFFT (Inverse Fast Fourier Transform) units 15-1 to 15-2, GI (Guard Interval) inserters and P/S (Parallel/Serial) convertors 16-1 and 16-2, D/A (Digital/Analog) convertors 17-1 and 17-2, RF (Radio Frequency) units 18-1 and 18-2, transmission antennas 19-1 and 19-2.

The multicarrier-signal transmitting apparatus performs CDTD by adding cyclic delays to signals to be transmitted from the transmission antenna 19-2, and not to signals to be transmitted from the transmission antenna 19-1. In the first embodiment, the signals to be transmitted from the transmission antenna 19-1 are not output to the rotators, and the signals to be transmitted from the transmission antenna 19-2 are output to the rotators. However, signals transmitted from the transmission antennas 19-1 and 19-2 may each be output to different rotators. In this case, cyclic delays to be added to the signals transmitted from the transmission antennas 19-1 and 19-2 are differentiated, thereby performing CDTD.

Although the rotators add phase rotations instead of cyclic delays to transmission signals, differences in phase rotation amounts among subcarriers are set to be identical, thereby achieving the same effect as when cyclic delays are added. Additionally, the transmission antennas 19-1 and 19-2 may be arranged in the same sector in the same base station, in different sectors in the same base station, or in different base stations.

The scheduler 10 assigns user data input to the multicarrier-signal transmission apparatus to data mappers 12-1 to 12-24 each performing processing for a corresponding subchannel. Specifically, subchannel-1 user data among the total number of 24 subchannels is output to the data mapper 12-1. Subchannel-2 user data is output to the data mapper 12-2. Subchannel-3 user data is output to the data mapper 12-3. Likewise, subchannel-24 user data is output to the data mapper 12-24. Additionally, the scheduler 10 outputs a control signal for determining phase rotation amounts to the rotators 14-1 to 14-24.

A subchannel is a frequency band to be a unit of scheduling. There are 24 subcarriers in the first embodiment. In the multicarrier-signal receiving apparatus, the subchannel serves as a unit in the frequency direction for demodulation processing.

The channel-estimation symbol generator 11-1 generates channel estimation symbols that are known symbols of the subchannel 1. The channel-estimation symbol generators 11-2 to 11-24 perform similar processing with respect to subchannels 2 to 24.

Data mapper 12-1 performs error correction encoding on the user data to be transmitted over the subchannel 1, modulates the user data for each assigned subcarrier, and thereby generates data symbols. Data mappers 12-2 to 12-24 perform similar processing with respect to subchannels 2 to 24, respectively.

The multiplexer 13-1 superimposes the data symbols generated by the data mapper 12-1 and the channel estimation symbols generated by the channel-estimation symbol generator 11-1 onto each subcarrier of subchannel 1, and outputs the superimposed subcarriers to the IFFT unit 15-1 and the rotator 14-1. The multiplexers 13-2 to 13-24 perform similar processing with respect to subchannels 2 to 24, respectively.

The rotator 14-1 adds a phase rotation to each subcarrier of subchannel 1 based on the control signal output from the scheduler 10, and outputs a result to the IFFT unit 15-2. The rotators 14-2 to 14-24 perform similar processing with respect to subchannels 2 to 24, respectively. The details of the rotators 14-1 to 14-24 will be explained later.

The IFFT units 15-1 and 15-2 perform inverse fast Fourier transform on each input subcarrier signal, and thereby convert the frequency-domain signals into time-domain signals. In the first embodiment, 600 subcarriers are used and the point number for the inverse fast Fourier transform performed by the IFFT units 15-1 and 15-2 is 1024.

The GI inserters and P/S converters 16-1 and 16-2 respectively insert guard intervals for reducing inter-symbol interference into the time-domain signals converted by the IFFT units 15-1 and 15-2, and convert the parallel signals into a serial signal to be output.

The D/A converters 17-1 and 17-2 convert the serial signals output from the GI inserters and P/S converters 16-1 and 16-2 into analog signals, respectively.

The RF units 18-1 and 18-2 convert the analog signals converted by the D/A converters 17-1 and 17-2 into frequency bands to be transmitted, adjust waves, then transmit the adjusted waves to the multicarrier-signal receiving apparatus through the transmission antennas 19-1 and 19-2, respectively.

Figure 2:
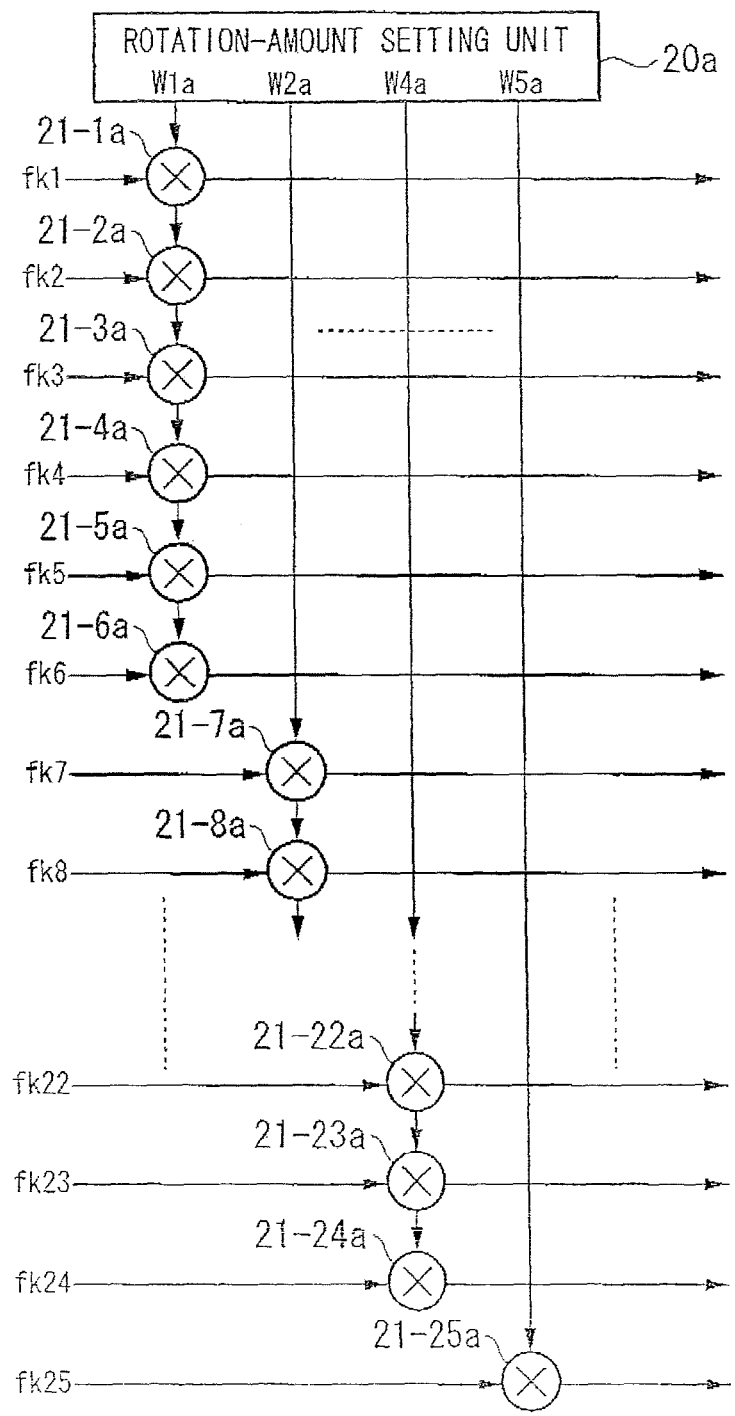
FIG. 2 is a schematic block diagram showing the configuration of a rotator 14-1 according to the first embodiment.

FIG. 2 shows the schematic configuration of the rotator 14-1 according to the first embodiment of the present invention. The rotator 14-1 includes rotation-amount setting unit 20a and complex multipliers 21-1a to 21-25a.

The rotation-amount setting unit 20a sets thereto phase rotation amounts W1a to W5a for every 6 subcarriers where W1a to W5a are real numbers or complex numbers whose absolute values are 1. A group of 6 subcarriers to which the same phase rotation amount is added is called a subcarrier group. Based on the scheduling information for each subchannel output from the scheduler 10, the rotation-amount setting unit 20a controls the phase rotation amounts such that phase-rotation-amount differences among adjacent subcarrier groups become identical when CDTD is used, while the same phase-rotation-amount is added to adjacent subcarrier groups (so that there is no phase-rotation amount difference) when CDTD is not used. Alternatively, phase-rotation-amount differences among adjacent subcarrier groups in one or more subchannels may be controlled to be identical. Alternatively, one of subcarrier groups in a subchannel where there is no phase-rotation-amount difference among subcarrier groups in the subchannel may be regarded as a reference subcarrier group, and a phase rotation amount of the reference subcarrier group may be determined according to a channel condition of the multicarrier-signal receiving apparatus. Alternatively, a unique phase-rotation-amount difference may be given to each multicarrier-signal transmitting apparatus, and the rotation-amount setting unit 20 may add phase rotations to all of the subcarriers of OFDM symbols using the phase rotation amounts.

Additionally, the number of subcarriers included in a subcarrier group can be changed by setting W1a=W2a, W3a=W4a, and the like.

Figure 3:
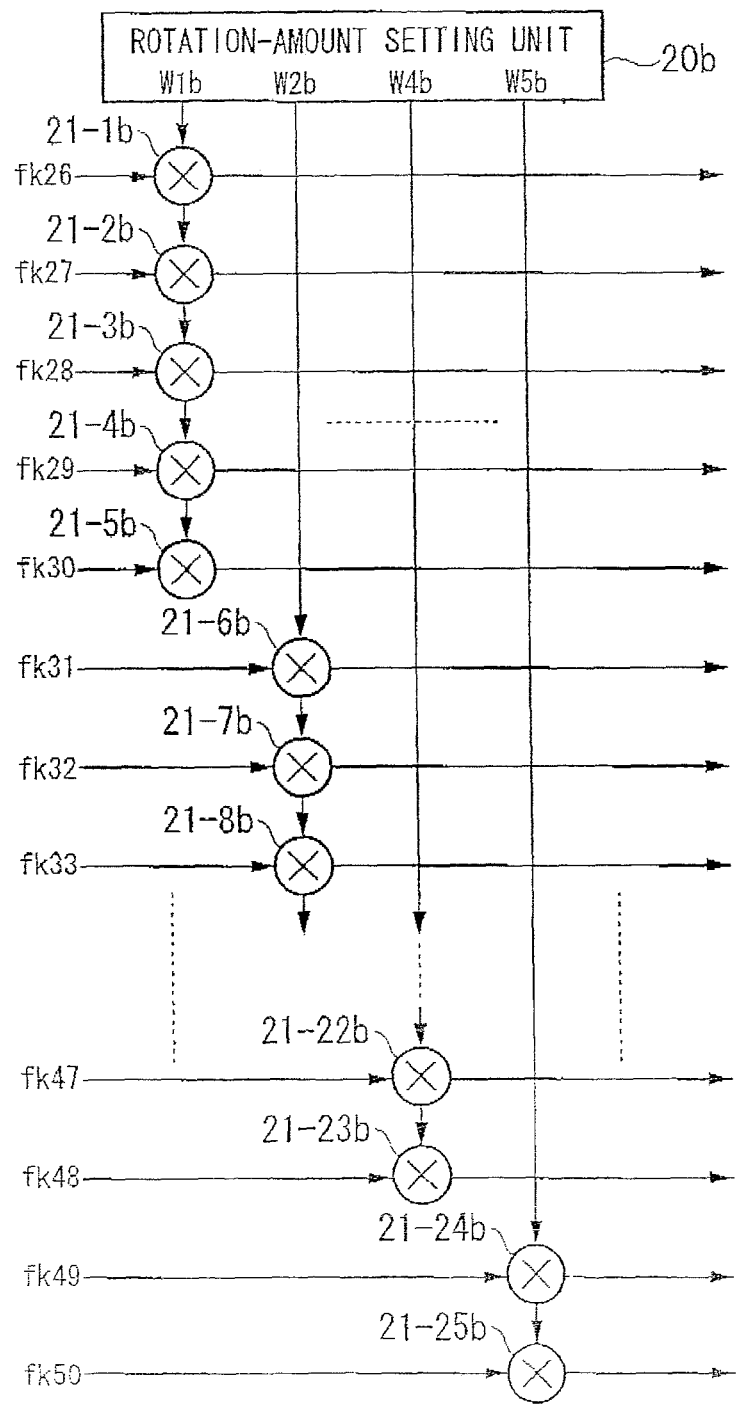
FIG. 3 is a schematic block diagram showing the configuration of a rotator 14-2 according to the first embodiment.

The complex multipliers (phase rotators) 21-1a to 21-25a multiply input signals fk1 to fk25 by the phase rotation amounts W1a to W5a. The reason that there are 25 input signals (fk1 to fk25) is that 25 subcarriers are included in one subchannel since 600 subcarriers are used as 24 subchannels. The reason that the phase rotation amounts (W1a to W5a) are determined for every 6 subcarriers is that channel estimation is simplified by equalizing the phase rotation amounts among 6 subcarriers since channel estimation subcarriers are inserted into every 6 subcarriers. As explained hereinafter, the input signal fk25 is grouped into a subcarrier group together with the next 5 input signals fk26 to fk30 (shown in FIG. 3), and the same phase rotation amount W5a is added thereto.

To equalize phase rotation amounts in a subcarrier group belonging to two subchannels when 6 subcarriers are grouped into one subcarrier group, a rotation-amount setting unit 20b included in the rotator 14-2 adjacent to the rotator 14-1 sets a phase rotation amount W1b to be phase rotation amounts for 5 subcarriers, phase rotation amounts W2b to W4b to be phase rotation amounts for respective 6 subcarriers, a phase rotation amount W5b to be phase rotation amounts for two subcarriers. The phase rotation amount W1b of the rotator 14-2 is set to be identical to the phase rotation amount W5a of the rotator 14-1.

Thus, the number of subcarriers for which the phase rotation amounts W1 to W5 are set differs so as to equalize rotation amounts among M subcarriers when channel estimation subcarriers are inserted into every M subcarriers.

Hereinafter, an example of phase rotation amounts set by the rotation-amount setting unit is explained.

When a phase rotation amount set by the rotation-amount setting unit to the complex multiplier that adds a phase rotation to a subcarrier k (the k-th subcarrier counted from the smallest frequency) to be transmitted from the n-th transmission antenna is denoted as $c_n(k)$, the rotation-amount setting unit sets, to the complex multiplier, $c_n(k)$ determined by Expression (1) where exp (x) represents the x-th power of the base of natural logarithm.

$$c_n(k) = \exp(-j(\omega_{n,SC} SG + \theta_{n,SC})) \qquad (1)$$

$\omega_{n,SC}$ represents a given phase-rotation-amount difference among subcarrier groups included in the SC-th subchannel to which the n-th transmission antenna and subcarrier k belong, and is a positive real number (n and SC are positive integers). SG=floor $(k/SG_{num})$ represents a subcarrier group number to which subcarrier k belongs where floor (x) represents a positive integer not exceeding x. $SG_{num}$ represents the number of subcarriers included in a subcarrier group ($SG_{num}$=6 in the first embodiment).

Similarly, SC=floor $(k/SC_{num})$ represents a subchannel number to which subcarrier k belongs. $SC_{num}$ represents the number of subcarriers included in a subchannel ($SC_{num}$=25 in the first embodiment). $\theta_{n,SC}$ represents an initial phase of the n-th antenna belonging to a subchannel SC.

When the rotation-amount setting unit sets thereto phase rotation amounts determined by Expression (1) in the case of subcarriers 25 and 26 to be transmitted from the antenna 2, subcarrier 25 belongs to subcarrier group 5 and subchannel 1, subcarrier 26 belongs to subcarrier group 5 and subchannel 2, and therefore $c_2(25)$ and $c_2(26)$ can be calculated as follows.

$$c_2(25) = \exp(-j(\omega_{2,1} \cdot 5 + \theta_{2,1}))$$

$$c_2(26) = \exp(-j(\omega_{2,2} \cdot 5 + \theta_{2,2}))$$

When it is assumed that $\omega_{2,1} = \omega$ and $\omega_{2,2} = 0$, then $c_2(25) = c_2(26)$ since subcarriers 25 and 26 belong to the same subcarrier group 5. As a result, $5\omega + \theta_{2,1} = \theta_{2,2}$. If the initial phase $\theta_{2,1}$ is determined, the initial phase $\theta_{2,2}$ of adjacent subchannel 2 is uniquely determined. $c_2(25)$ and $c_2(26)$ correspond to the phase rotation amount W5a shown in FIG. 2 and the phase rotation amount W1b shown in FIG. 3, respectively.

In the configuration of the multicarrier-signal transmitting apparatus, a constant phase rotation is added to subcarriers included in a subcarrier group, and a phase difference defined by on, sc is added among subcarrier groups included in the same subchannel. In other words, a phase rotation amount is set to be constant in a subcarrier group, while a cyclic delay is added to a subchannel using CDTD by setting the phase-rotation-amount difference $\omega_{n,\,SC}$ to an adequate value, and no cyclic delay is added to a subchannel not using CDTD by setting the phase-rotation-amount difference $\omega_{n,\,SC}$ to 0.

Even in the same subchannel, $\omega_{n,\,SC}$ and $\theta_{n,\,SC}$ are changed according to the time zone, and the rotation-amount setting unit sets thereto values acquired by Expression (1). Thereby, a cyclic delay can be added by setting the phase-rotation-amount difference $\omega_{n,\,SC}$ among subcarrier groups to an adequate value, or no cyclic delay can be added by setting the phase-rotation-amount difference $\omega_{n,\,SC}$ among subcarrier groups to 0 for each resource block that is a domain surrounded by a particular subchannel and time.

An effect caused by setting a phase rotation amount to be constant in a subcarrier group will be explained with an explanation of the multicarrier-signal receiving apparatus.

Although the method of adding phase rotations corresponding to the phase rotation amounts indicated by Expression (1) has been explained, sequences different from Expression (1), such as M (Maximal-length) sequences or PN (Pseudo Noise) sequences such as Gold codes, may be assigned to the phase rotation amounts W1a to W5a and W1b to W5b for each subcarrier group that are set by the rotation-amount setting unit, and thereby a phase rotation corresponding to the phase rotation amount may be added.

Figure 4:
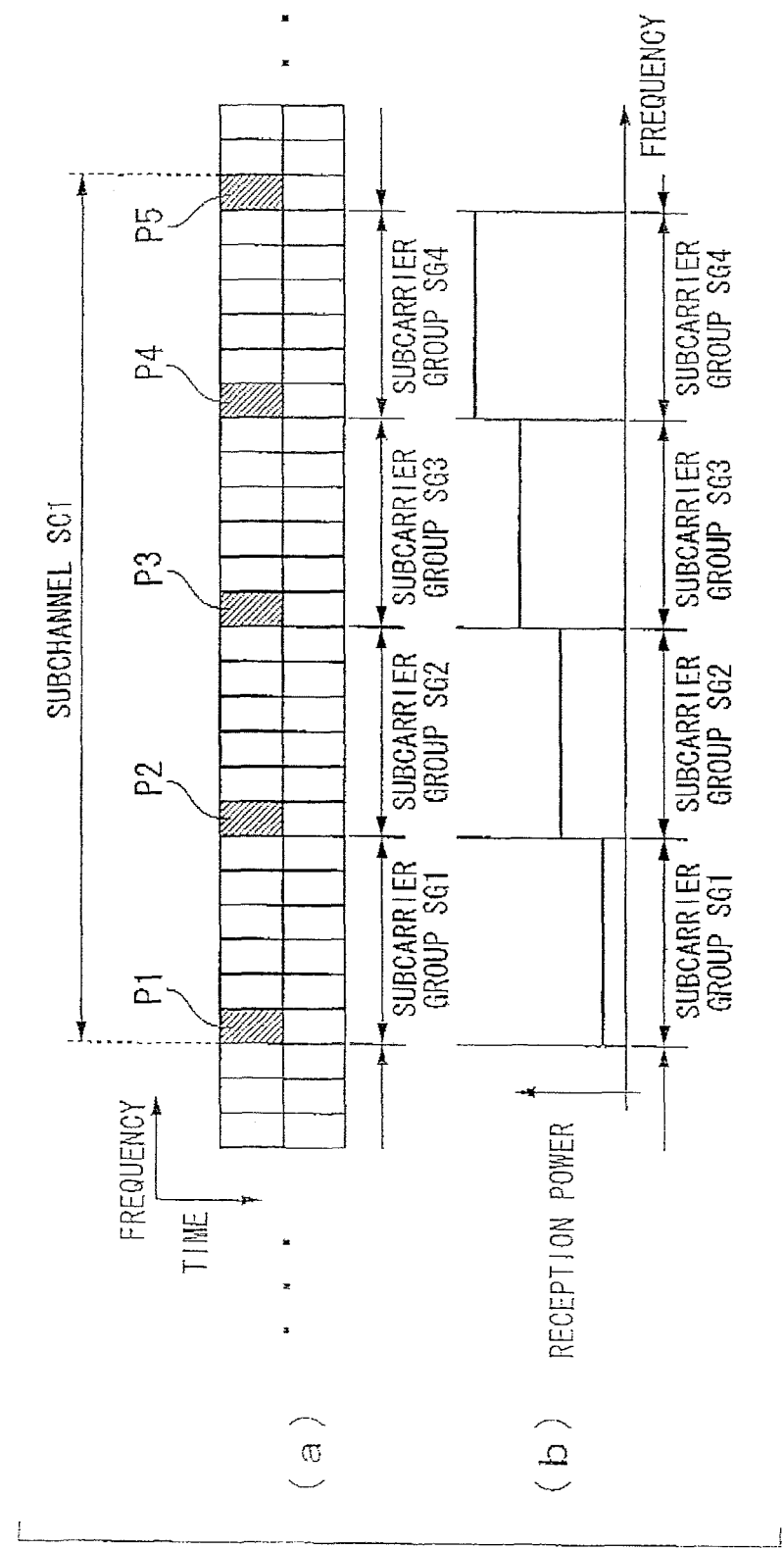
FIG. 4 shows an example of OFDMA signals according to the first embodiment being grouped into subcarrier groups SG1 to SG4 to be transmitted.

FIG. 4 shows an example relationship between a case where OFDMA signals are grouped into subcarrier groups to be transmitted and the reception power received by a terminal when the phase-rotation-amount difference $\omega_{n,\,SC}$ is set to be an adequate value that is not 0.

FIG. 4 (a) shows a state of subcarriers and OFDM symbols being respectively arranged along the horizontal and the vertical axes representing frequency and time. Here, only two OFDM symbols are shown in the time direction for simplicity. In this case, the channel estimation symbols P1 to P5 are arranged at every 6 subcarriers.

FIG. 4 (b) shows a state of reception signals being distorted in frequency domains where the horizontal and the vertical axes represent frequency and the reception power.

Since different phase rotations are added to subcarrier groups SG1 to SG4 overlapping subchannel SC1 as explained above, significant differences occur among the reception powers of subcarrier groups SG1 to SG4 when the reception powers are compared with one another, and the correlation thereamong is small. On the other hand, adjacent channel estimation symbols (for example, P1 and P2) are usually inserted at an interval by which variation due to channels is sufficiently small, and a constant phase rotation amount is added to a subcarrier group. Therefore, the reception power hardly varies in a subcarrier group.

Although only the reception power is shown for simplicity, the same can apply to phase. Therefore, data symbols included in a subcarrier group can be demodulated using a channel estimation value calculated from a channel estimation symbol included in the subcarrier group when a constant phase rotation is added to each subcarrier group.

Figure 5:
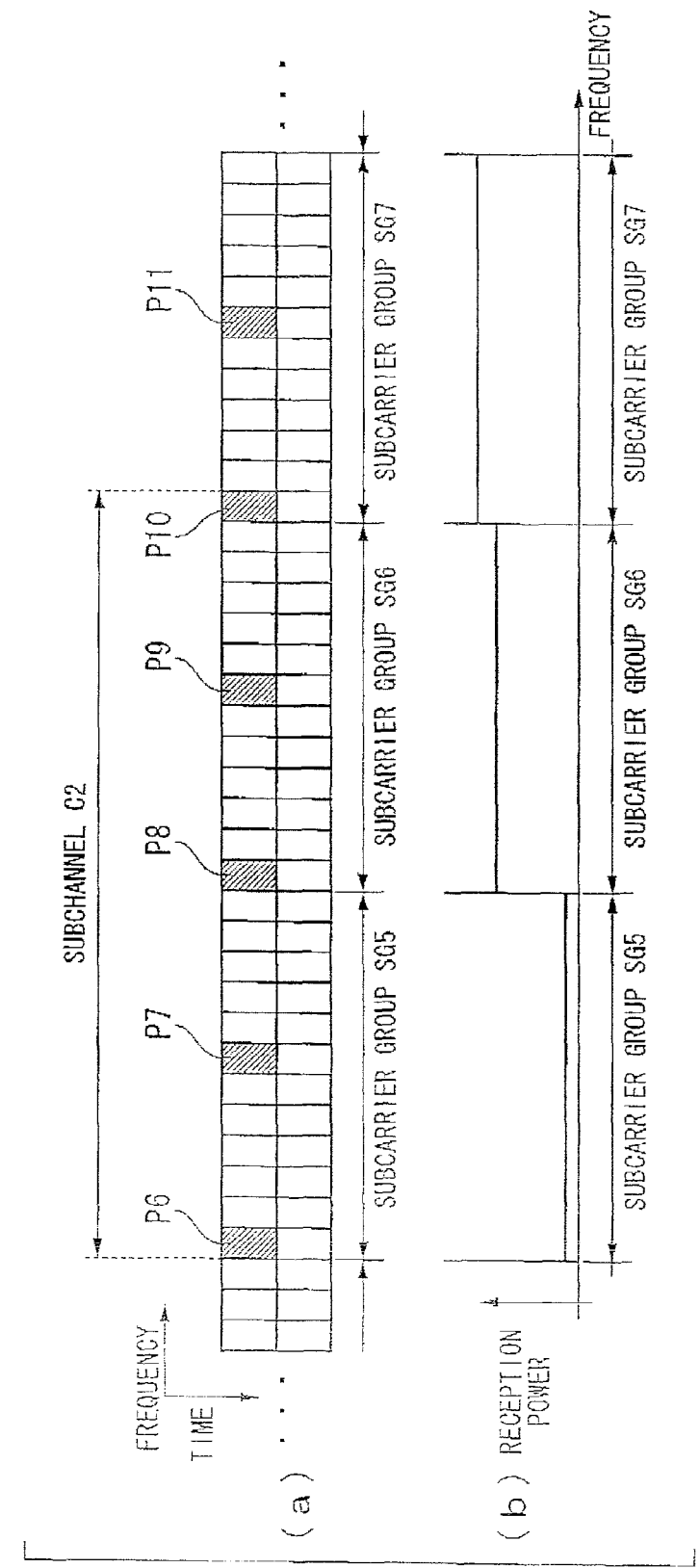
FIG. 5 shows an example of OFDMA signals according to the first embodiment being grouped into subcarrier groups SG5 to SG7 to be transmitted.

Similar to FIG. 4, FIG. 5 shows an example relationship between a state of OFDMA signals being grouped into subcarrier groups SG5 to SG7 to be transmitted that are shown in FIG. 5 (a) and the reception power received by a terminal that is shown in FIG. 5 (b).

Although 12 subcarriers are included in each of subcarrier groups SG5 to SG7, the explanation given with reference to FIG. 4 can apply here even if the number of subcarriers is changed. If operations of channel estimation and channel compensation on the terminal side are considered, the number of subcarriers included in a subcarrier group is preferably a multiple of the subcarrier interval M (M=6 in this case).

Figure 6:
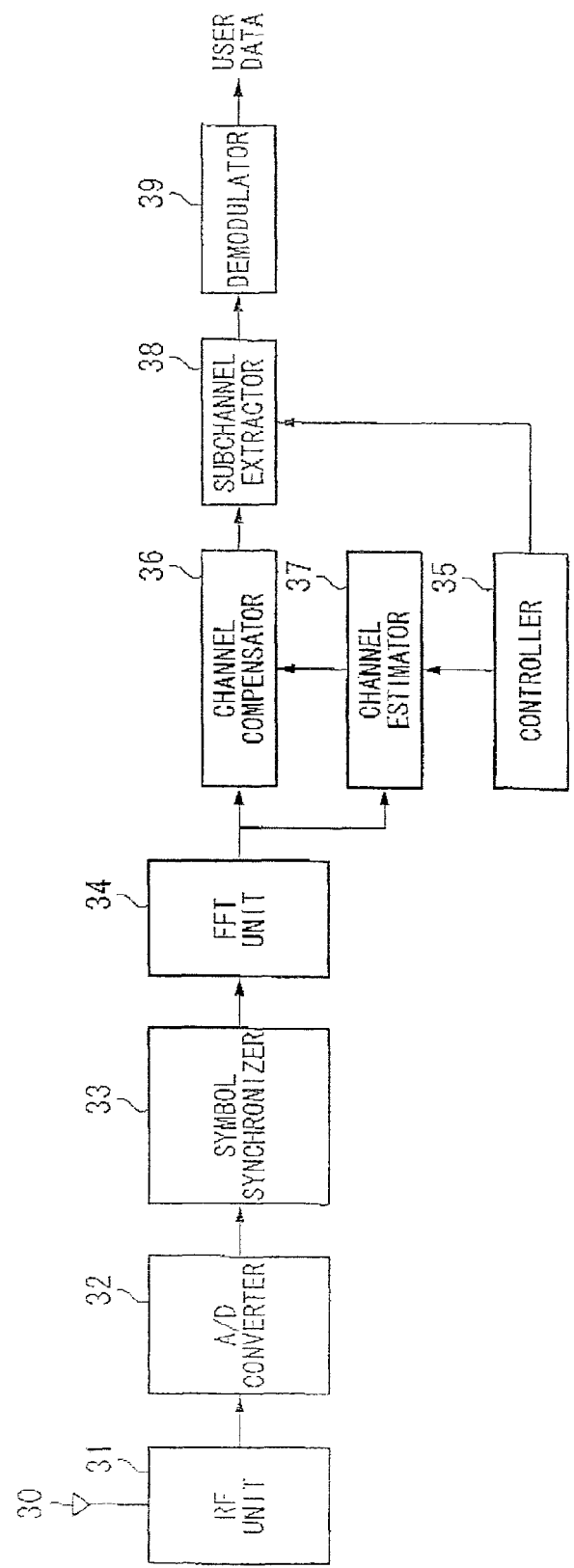
FIG. 6 is a schematic block diagram showing the configuration of the multicarrier-signal receiving apparatus according to the first embodiment.

FIG. 6 is a schematic block diagram showing the configuration of a multicarrier-signal receiving apparatus according to the first embodiment. The multicarrier-signal receiving apparatus demodulates data symbols included in a subcarrier group using a channel estimation value calculated from a channel estimation symbol included in the subcarrier group when a constant phase rotation is added to subcarriers included in each subcarrier group.

The multicarrier-signal receiving apparatus includes a reception antenna 30, an RF (radio frequency) unit 31, an A/D (Analog/Digital) convertor 32, a symbol synchronizer 33, an FFT (Fast Fourier Transform) unit 34, a controller 35, a channel compensator 36, a channel estimator 37, a subchannel extractor 38, and a demodulator 39.

The reception antenna 30 receives signals transmitted from the multicarrier-signal transmitting apparatus.

The RF unit 31 adjusts the signals received by the reception antenna 30 so as to lower the frequency to a frequency band applicable to an A/D conversion.

The A/D convertor 32 converts analog signals into digital signals.

The symbol synchronizer 33 synchronizes OFDM signals.

FFT unit (Fourier transformer) 34 performs fast Fourier transform on the received OFDM symbols to acquire each subcarrier signal.

The channel compensator 36 performs channel compensation of data included in the output of the FFT unit 34 based on channel estimation information that is an output of the channel estimator 37.

The channel estimator 37 estimates a channel response of each subcarrier from channel estimation symbols included in the output of the FFT unit 34. As explained later, the channel estimator 37 changes, according to an instruction from the controller 35, a method of calculating a channel estimation value for each subcarrier based on a channel estimation value acquired from the channel estimation symbol.

The subchannel extractor 38 extracts subchannel signals to be demodulated by the multicarrier-signal receiving apparatus based on used-subchannel information from the controller 35.

The demodulator 39 demodulates the subchannel signals to be demodulated that are extracted by the subchannel extractor 38.

Although an example of the multicarrier-signal receiving apparatus has been shown, the configuration is not limited thereto.

As shown in FIGS. 4 and 5, the bandwidth of the subchannel to be demodulated is not always identical to the bandwidth of the subcarrier group. Therefore, the channel estimator 37 performs channel estimation using channel estimation symbols included in all of the subcarrier groups that include the subchannel to be demodulated. In other words, the channel estimation is performed using the channel estimation symbols P1 to P5 in the case of subchannel SC1 shown in FIG. 4, and the channel estimation symbols P6 to P11 in the case of subchannel SC2 shown in FIG. 5.

Hereinafter, operations of the channel estimator 37 (shown in FIG. 6) are explained with reference to FIGS. 7 and 8. Firstly, a case where the channel estimator 37 performs averaging in a subcarrier group when a channel estimation value for each subcarrier is calculated is explained with reference to FIG. 7.

Figure 7:
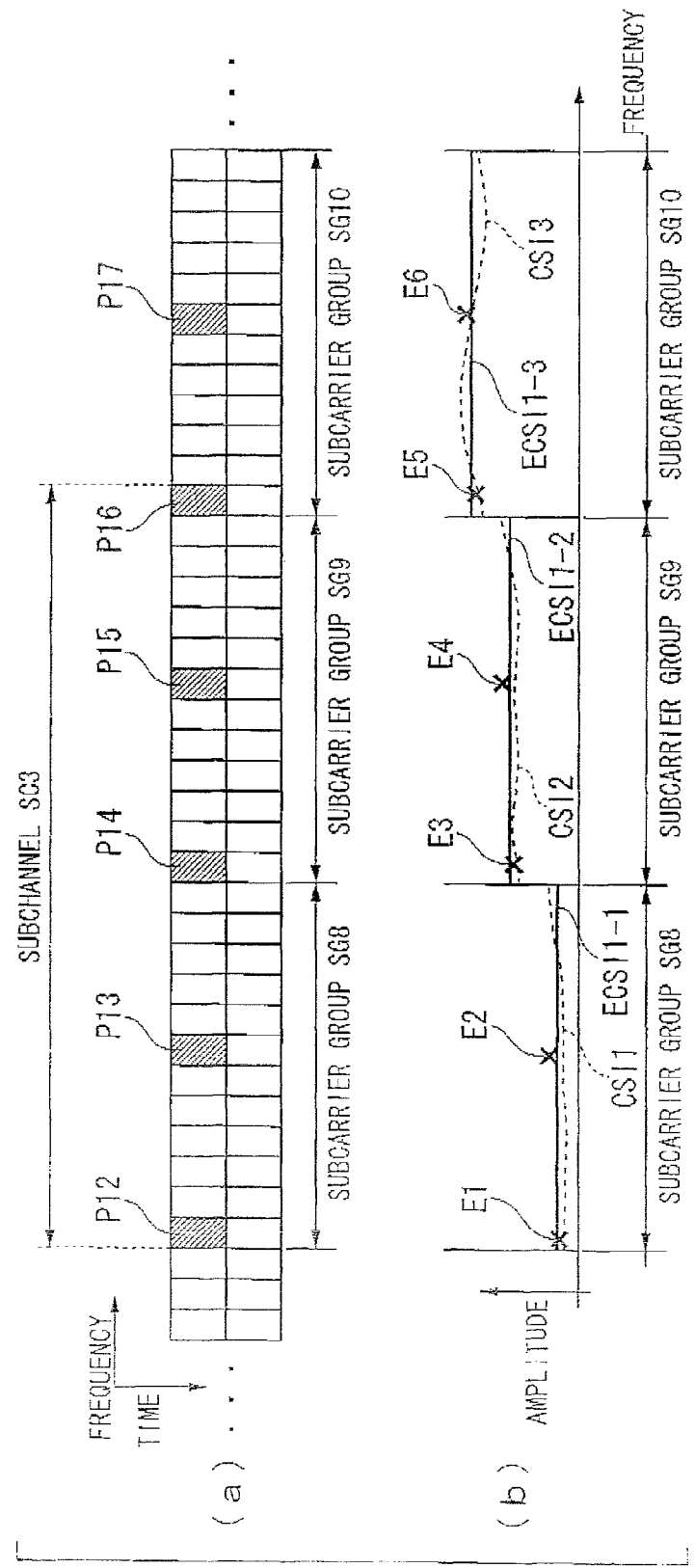
FIG. 7 shows a case where a channel estimator 37 according to the first embodiment performs averaging in each subcarrier group upon channel estimation for each subcarrier.

FIG. 7 (a) shows a state of subcarriers and OFDM symbols being respectively arranged along the horizontal and the vertical axes representing frequency and time. As shown in FIG. 7 (a), channel estimation symbols P12 to P17 are arranged at every 6 subcarriers, subchannel SC3 includes 25 subcarriers, and each of subcarrier groups SG8 to SG10 includes 12 subcarriers.

FIG. 7 (b) shows a state of reception signals being distorted in frequency domains where the horizontal and the vertical axes represent frequency and time. Dashed lines (CSI 1 to CSI 3) represent actual channel responses. Reference characters× (E1 to E6) represent channel estimation values estimated with the use of the channel estimation symbols. Solid lines (ECSI1-1 to ECSI1-3) are acquired by averaging channel estimation values included in the same subcarrier group among the channel estimation values E1 to E6 and regarding the averaged values as the channel estimation values of the corresponding subcarrier groups.

In other words, subcarrier groups including the subchannel of the bandwidth to be demodulated are considered, and channel estimation symbols included in the subcarrier groups are used in the multicarrier-signal receiving apparatus. In other words, instead of the channel estimation symbols P1 to P16 included in subchannel SC3 being used, the channel estimation symbols P2 to P17 in a wider range are used. This range depends on the relationship between subchannel SC3 and subcarrier groups SG8 to SG10.

Although amplitudes of the reception signals and the averaged amplitude thereof are shown for simplicity of the drawings, the channel estimation values E1 to E6 are actually complex numbers, and the average value indicates an average of the complex numbers. The complex numbers of the channel estimation values E1 to E6 may be divided into absolute values and arguments, and a complex number acquired by respectively averaging the absolute values and the arguments may be regarded as the average value.

The channel compensator 36 shown in FIG. 6 performs channel compensation on the data symbols included in each subcarrier group using the average channel estimation values ECSI1-1 to ECSI1-3 calculated by the channel estimator 37.

In this manner, channel estimation values are calculated using the channel estimation values estimated from the channel estimation symbols included not in the subchannel as a unit of demodulation processing, but in the same subcarrier group in which the same phase rotation amount is added to the subcarriers so as to decrease variation in channel responses among the subcarriers as much as possible. Thereby, channel estimation values with channel estimation errors due to noise being suppressed can be acquired, and enhancement of the reception characteristics can be expected. Additionally, the channel estimation symbols are arranged separately in the frequency direction. Thereby, the number of channel estimation symbols can be reduced, and the utilization efficiency of bands can be enhanced.

Figure 8:
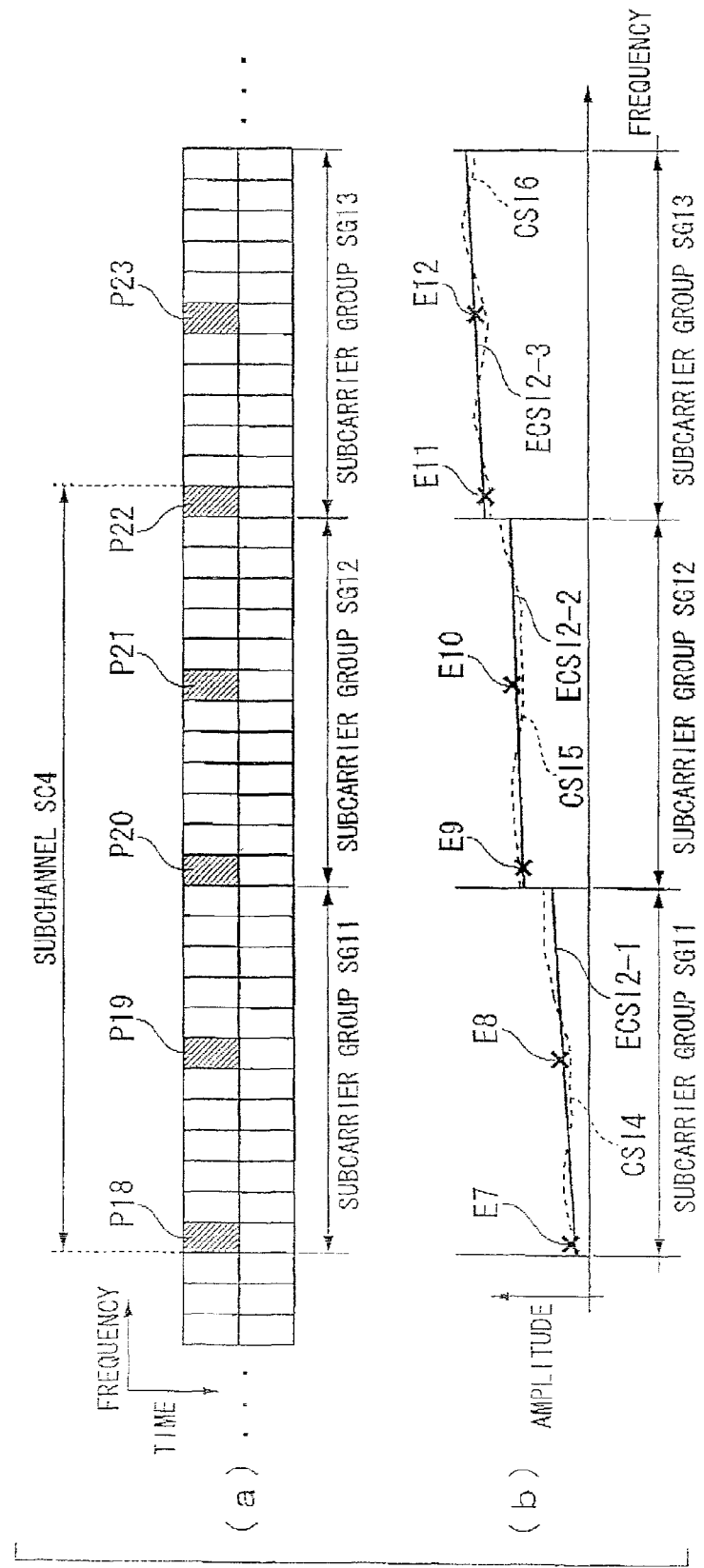
FIG. 8 shows a case where the channel estimator 37 according to the first embodiment performs linear interpolation in each subcarrier group upon channel estimation for each subcarrier.

FIG. 8 shows a case where the channel estimator 37 performs (linear) interpolation in a subcarrier group upon channel estimation for each subcarrier.

Although FIG. 8 is substantially the same as FIG. 7, solid lines (ECSI2-1 to ECSI2-3) are acquired by performing linear interpolation on channel estimation values belonging to the same subcarrier group among the channel estimation values E7 to E12 and regarding the result as channel estimation values of subcarriers in the subcarrier group.

Similar to FIG. 7, subcarrier groups SG11 to SG 13 including subchannel SC4 of the bandwidth to be demodulated are considered, and the channel estimation symbols P18 to P23 included in the subcarrier groups are used in the multicarrier-signal receiving apparatus. In other words, instead of only the channel estimation symbols P18 to P22 included in subchannel SC4 being used, the channel estimation symbols P18 to P23 in a wider range are used. This range depends on a relationship between subchannel SC4 and subcarrier groups SG 11 to SG 13.

Although amplitudes of the reception signals and the linearly-interpolated amplitude thereof are shown for simplicity of the drawings, the channel estimation values E7 to E12 are actually complex numbers, and the linear interpolation indicates linear interpolation of the complex numbers on a complex plane. The complex numbers of the channel estimation values E7 to E12 may be divided into absolute values and arguments, and a complex number acquired by respectively linearly-interpolating the absolute values and the arguments may be used as the complex number. An interpolation method to be used is not limited to the linear interpolation, and two-dimensional interpolation or three-dimensional interpolation may be used.

The channel compensator 36 shown in FIG. 6 performs channel compensation using the channel estimation values ECSI2-1 to ECSI2-3 interpolated by the channel estimator 37.

Since channel estimation values are calculated in this manner, channel estimation values following subtle channel variation in each of subcarrier groups SG11 to SG13 can be acquired, and channel estimation errors can be suppressed. Thereby, enhancement of the reception characteristics can be expected. Additionally, the channel estimation symbols are arranged separately in the frequency direction. Thereby, the number of channel estimation symbols can be reduced, and the utilization efficiency of bands can be enhanced.

If three or more channel estimation symbols are included in one subcarrier group, the averaging and the linear interpolation may be combined. For example, two average values are acquired from three channel estimation values, and the two average values can be linearly interpolated.

FIGS. 7 and 8 show cases where the channel estimation symbols P12 and P13 included in the subcarrier group SG8 or the channel estimation symbols P18 and P19 included in the subcarrier group SG11 are included in the same time section of OFDM symbols (present at the same point in time). As a matter of course, channel estimation values can similarly be calculated using the averaging and the linear interpolation when these channel estimation symbols are arranged in different time sections of OFDM symbols (present at different points in time).

Second Embodiment

Hereinafter, a second embodiment is explained. In the second embodiment, for each resource block that is a domain surrounded by particular subchannels and time in a frame, the phase rotation amounts added by the multicarrier-signal transmitting apparatus differ among the subcarrier groups at some time and do not differ at another time. Additionally, the multicarrier-signal receiving apparatus performs an interpolation, such as averaging or a linear interpolation, on channel estimation values in each subcarrier group or in multiple subcarrier groups. Thereby, channel estimation errors for a subcarrier by which a channel estimation symbol is not transmitted can be suppressed, and channel estimation values are precisely acquired.

Figure 9A:
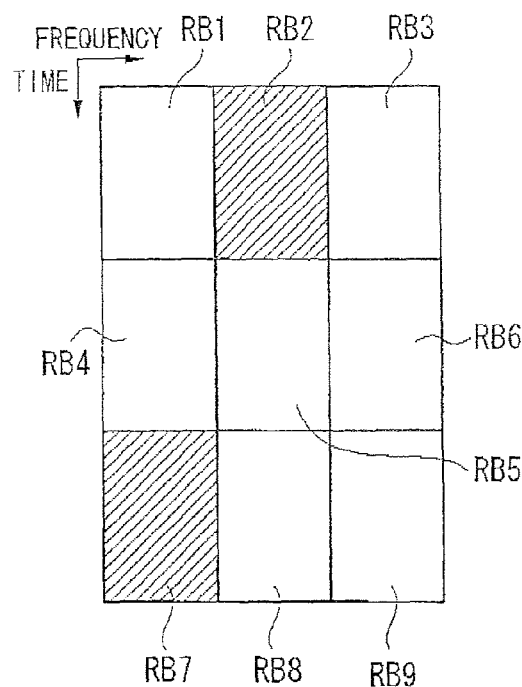
FIG. 9A shows an example of transmitted signals according to a second embodiment being divided into multiple resource blocks RB1 to RB9 in a frame.

FIG. 9A shows an example of transmitted signals being divided into multiple resource blocks RB1 to RB9 at given frequency and time intervals in one frame where the horizontal and the vertical axes represent frequency and time. The width of each of the resource blocks RB1 to RB9 in the frequency direction corresponds to that of a subchannel. These resource blocks RB1 to RB9 are transmitted by the multicarrier-signal transmitting apparatus explained in the first embodiment. In the resource blocks RB2 and RB7, the phase rotation amounts added by the multicarrier-signal transmitting apparatus differ among subcarrier groups. In the resource blocks RB1, RB3 to RB6, RB8, and RB9, the phase rotation amounts added by the multicarrier-signal transmitting apparatus do not differ among subcarrier groups (the difference is 0).

Explanations are given in the second embodiment assuming the following. The number of subcarriers included in a subcarrier group and whether or not phase rotation amounts to be added with respect to resource blocks differ among subcarrier groups are preliminarily determined. The content of the above conditions are stored in the multicarrier-signal transmitting apparatus and the multicarrier-signal receiving apparatus, and these apparatuses operate based on the stored content. However, the multicarrier-signal transmitting apparatus may determine a phase rotation amount to be added to each subcarrier group included in each resource block based on whether or not CDTD is used, and indicate to the multicarrier-signal receiving apparatus whether or not the phase rotation amounts differ among subcarrier groups.

Figure 9B:
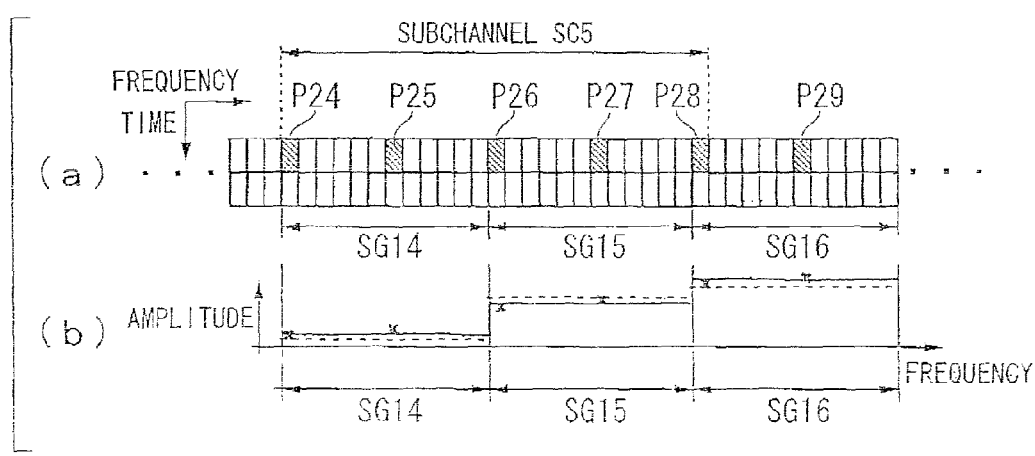
FIG. 9B shows a case where a subchannel SC5 according to the second embodiment corresponds to a resource block RB2 or RB7 in which CDTD is used.

FIG. 9B (a) shows an example of subcarriers and OFDM symbols being arranged along the horizontal and the vertical axes representing frequency and time. As shown in FIG. 9B (a), channel estimation symbols P24 to P29 are arranged at every 6 subcarriers. Subchannel SC5 includes 25 subcarriers. Each of the subcarrier groups SG14 to SG16 includes 12 subcarriers.

FIG. 9B (b) shows an example of reception signals being distorted in frequency domains where the horizontal and the vertical axes represent frequency and time.

FIG. 9B shows a case where there is a phase rotation amount difference among subcarrier groups included in subchannel SC5 corresponding to the resource block RB2 or RB7 in which CDTD is used. Similar to FIGS. 7 and 8, the averaging or the linear interpolation of channel estimation values based on channel estimation symbols included in each subcarrier group is used as the channel estimating method with respect to the subcarriers included in subchannel SC5 that is performed by the channel estimator 37.

Figure 9C:
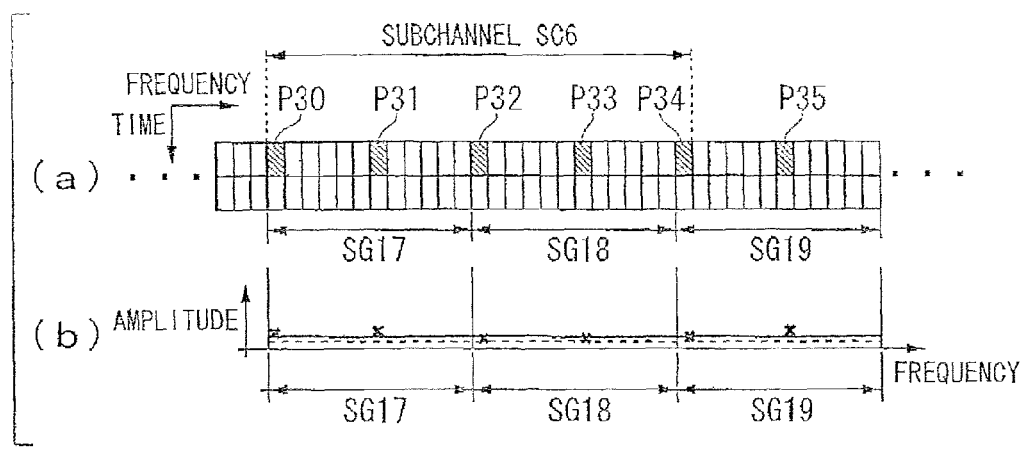
FIG. 9C shows a case where a subchannel SC6 according to the second embodiment corresponds to any one of resource blocks RB1, RB3 to RB6, RB8, and RB9 in which CDTD is not used.

On the other hand, FIG. 9C (a) shows an example of subcarriers and OFDM symbols being arranged along the horizontal and the vertical axes representing frequency and time. Similar to FIG. 9B (a), channel estimation symbols P30 to P35 are arranged at every 6 subcarriers. Subchannel SC6 includes 25 subcarriers. Each of subcarrier groups SG17 to SG19 includes 12 subcarriers.

FIG. 9C (b) shows an example of the reception signals being distorted in frequency domains where the horizontal and the vertical axes represent frequency and time.

FIG. 9C shows a case where there is no phase rotation amount difference among subcarrier groups included in the subchannel SC6 corresponding to any one of the resource blocks RB1, RB3 to RB6, RB8, and RB9. The averaging or the linear interpolation of channel estimation values using the channel estimation symbols P30 to P35 included in the subcarrier groups SG17 to SG19 is used as the channel estimating method with respect to the subcarriers included in subchannel SC6 that is performed by the channel estimator 37.

Although a multicarrier-signal receiving apparatus in the second embodiment is substantially the same as that in the first embodiment, only operations of the controller 35 and the channel estimator 37 differ.

In the case of the resource blocks RB2 and RB7 where there is a phase rotation amount difference among the subcarrier groups (in the case of FIG. 9B), the controller 35 instructs the channel estimator 37 to average or linearly interpolate only channel estimation values in the same subcarrier group similarly to FIGS. 7 and 8 in the first embodiment. In the case of the resource blocks RB1, RB3 to RB6, RB8, and RB9 (in the case of FIG. 9C), the controller 35 instructs the channel estimator 37 to average or linearly interpolate channel estimation values in multiple subcarrier groups.

The channel estimator 37 calculates the channel estimation value of each subcarrier using the calculation method according to the instruction from the controller 35.

Characteristics that channel responses greatly vary among subcarrier groups in the case of the resource blocks having phase rotation amount differences among subcarrier groups, and that channel responses hardly vary among subcarrier groups in the case of the resource blocks having no phase rotation amount difference among subcarrier groups are utilized. Thereby, channel estimation errors with respect to each subcarrier are suppressed, and channel estimation can be precisely performed even when channel estimation symbols are arranged separately in the frequency direction.

Third Embodiment

Hereinafter, a third embodiment is explained. In the third embodiment, for each resource block that is a domain surrounded by particular subchannels and time in a frame, the phase rotation amounts added by the multicarrier-signal transmitting apparatus differ among the subcarrier groups at some time and do not differ at another time according to a physical channel included in the resource block. Additionally, the multicarrier-signal receiving apparatus performs an interpolation, such as averaging or a linear interpolation, of channel estimation values in each subcarrier group or multiple subcarrier groups according to the physical channel included in the resource block. Thereby, channel estimation values are precisely acquired for subcarriers by which no channel estimation symbol is transmitted.

Figure 10A:
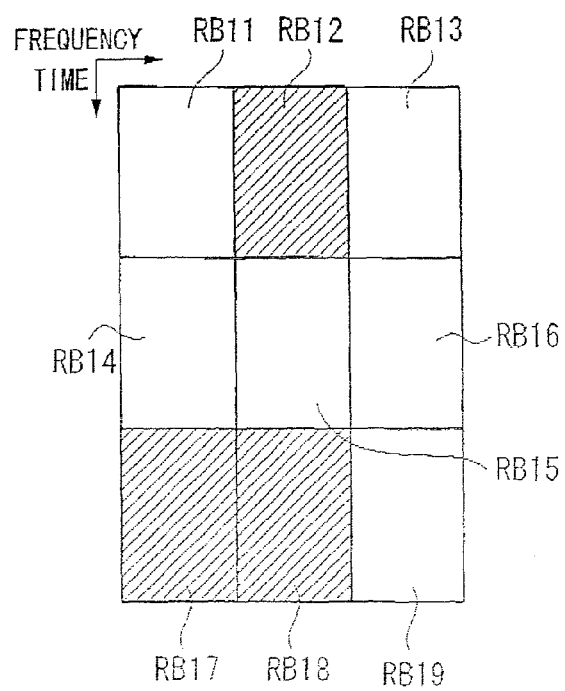
FIG. 10A shows an example of transmitted signals according to a third embodiment being divided into multiple resource blocks RB11 to RB19 in a frame.

FIG. 10A shows an example of transmitted signals being divided into multiple resource blocks RB11 to RB19 at given frequency and time intervals in one frame where the horizontal and the vertical axes represent frequency and time. The width of each of the resource blocks RB11 to RB19 in the frequency direction corresponds to that of a subchannel. These resource blocks RB11 to RB19 are transmitted by the multicarrier-signal transmitting apparatus explained in the first embodiment. Since the resource blocks RB12, RB17, and RB18 each include particular physical channels (for example, PICH, PCH, or MBMS), phase rotation amounts to be added differ among subcarrier groups. Since the resource blocks RB11, RB13 to RB16, and RB19 do not include particular physical channels (for example, PICH, PCH, or MBMS), phase rotation amounts to be added by the multicarrier-signal transmitting apparatus do not differ among subcarrier groups (the difference is 0).

The multicarrier-signal transmitting apparatus adds phase rotation amounts that are different among subcarrier groups only to the resource blocks each including a particular physical channel (for example, PICH, PCH, or MBMS). Here, it is assumed that RB12 includes PICH, and RB17 and RB18 include MBMS.

PCH (Paging Channel) is a downlink common channel and used for paging a terminal. PICH (Paging Indicator Channel) is a downlink common channel and used for indicating, for example, the position of a PCH to a terminal. MBMS (Multimedia Broadcast Multicast Service Channel) is a downlink common channel and used for transmitting, for example, a broadcast signal.

Figure 10B:
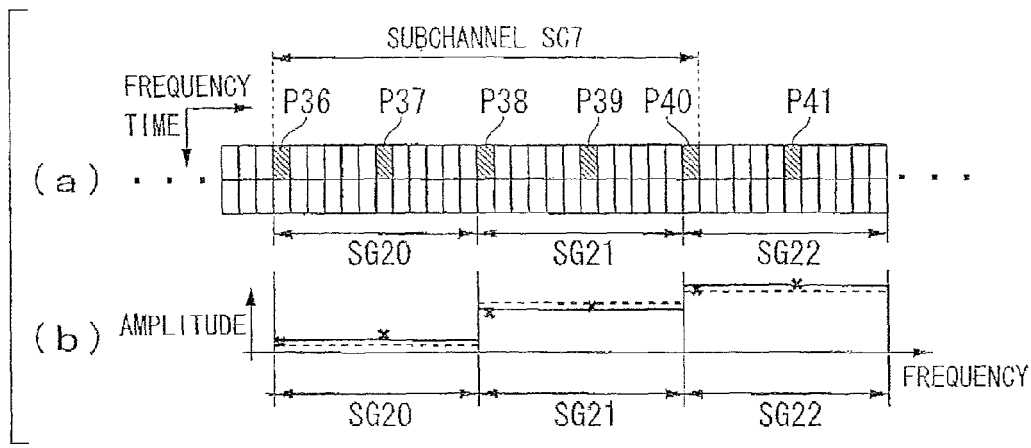
FIG. 10B shows a case where a subchannel SC7 according to the third embodiment corresponds to any one of resource blocks RB12, RB17, and RB18 each including a particular physical channel.

FIG. 10B (a) shows an example of subcarriers and OFDM symbols being arranged along the horizontal and the vertical axes representing frequency and time. Channel estimation symbols P36 to P41 are arranged at every 6 subcarriers. Subchannel SC7 includes 25 subcarriers. Each of the subcarrier groups SG20 to SG22 includes 12 subcarriers.

FIG. 10B (b) shows an example of reception signals being distorted in frequency domains where the horizontal and the vertical axes represent frequency and time.

FIG. 10B shows a case where subchannel SC7 corresponds to any one of the resource blocks RB12, RB17, or RB18 each including a particular physical channel and therefore having a phase rotation amount difference among subcarrier groups. The method explained in FIGS. 7 and 8 is used as the channel estimating method with respect to the subcarriers included in subchannel SC7 that is performed by the channel estimator 37.

Figure 10C:
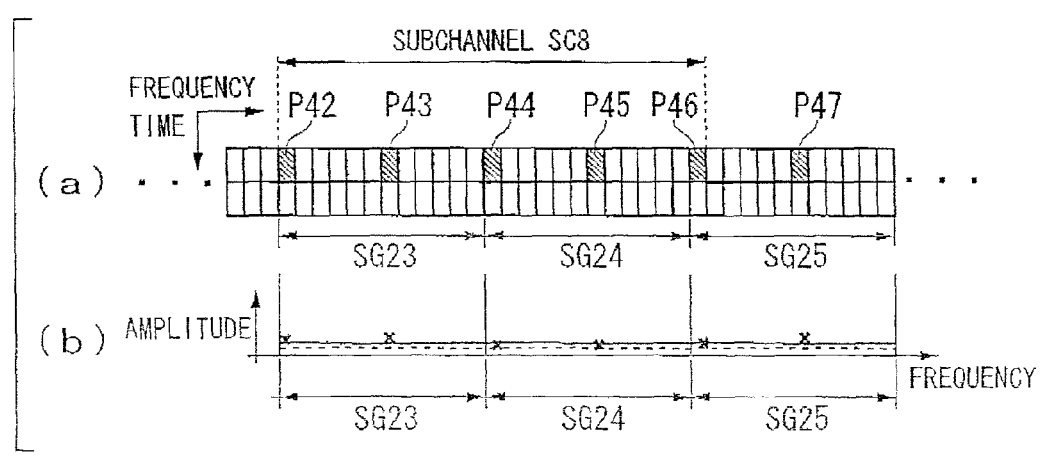
FIG. 10C shows a case where a subchannel SC8 according to the third embodiment corresponds to any one of resource blocks RB11, RB13 to RB16, and RB19 each including no particular physical channel.
Figure 11:
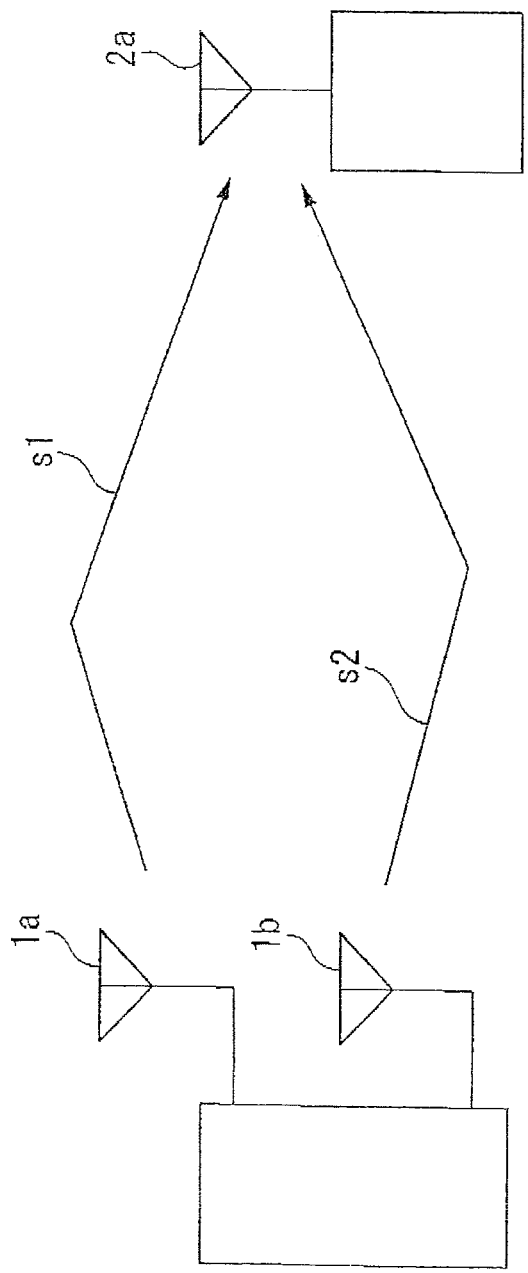
FIG. 11 shows a case where signals are transmitted from a conventional multicarrier-signal transmitting apparatus including multiple transmission antennas to a conventional multicarrier-signal receiving apparatus.
Figure 12:
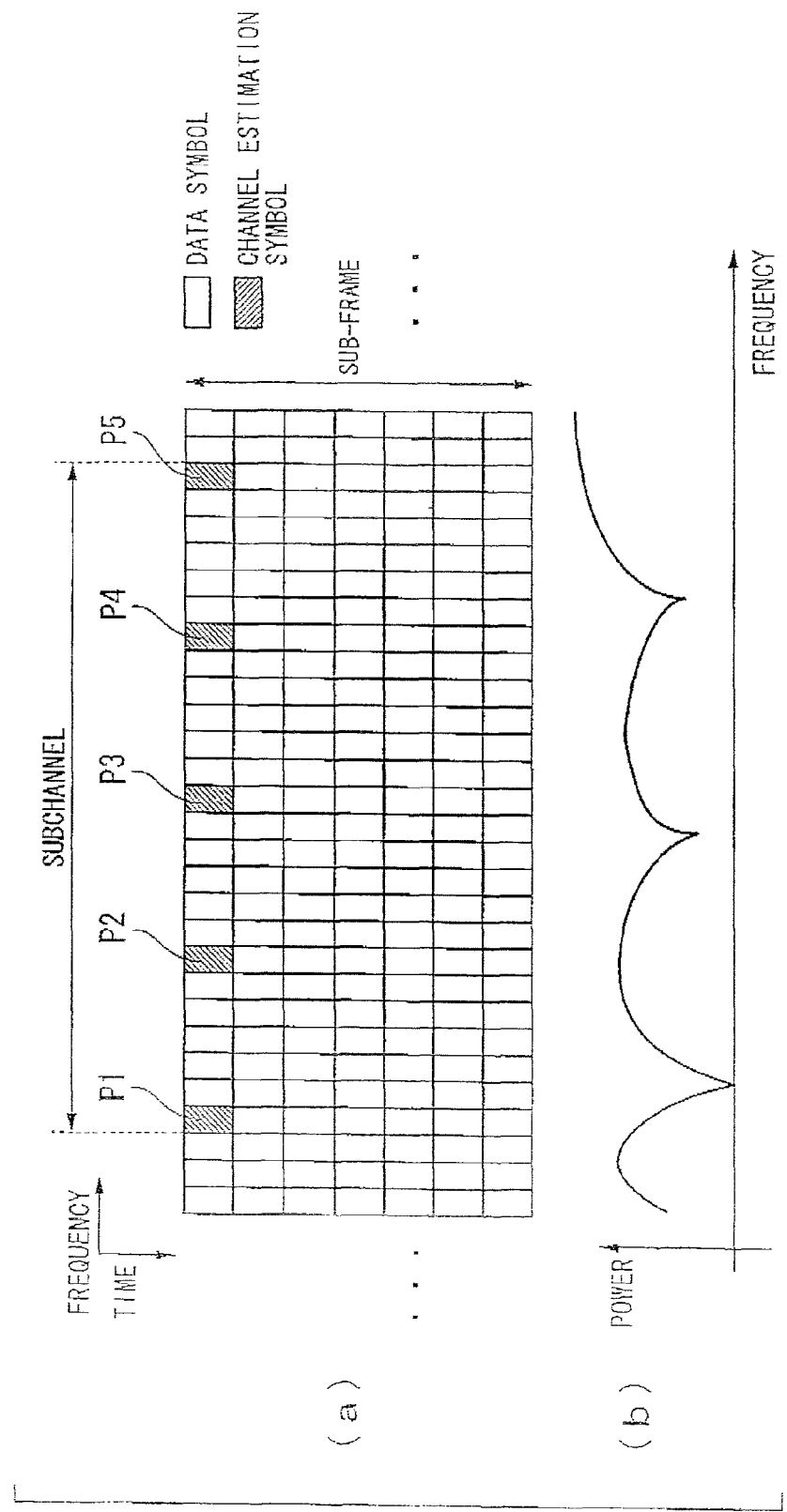
FIG. 12 shows the configuration and the power of conventional reception signals.

On the other hand, FIG. 10C (a) shows an example of subcarriers and OFDM symbols being arranged along the horizontal and the vertical axes representing frequency and time. Similar to FIG. 10B (a), channel estimation symbols P42 to P47 are arranged at every 6 subcarriers. Subchannel SC8 includes 25 subcarriers. Each of the subcarrier groups SG23 to SG25 includes 12 subcarriers.

FIG. 10C (b) shows an example of the reception signals being distorted in frequency domains where the horizontal and the vertical axes represent frequency and time.

FIG. 10C shows a case where subchannel SC8 corresponds to any one of the resource blocks RB11, RB13 to RB16, and RB19 each including no particular physical channel and therefore having no phase rotation amount difference among subcarrier groups. The averaging or the linear interpolation of channel estimation values using the channel estimation symbols P42 to P47 included in the subcarrier groups SG23 to SG25 is used as the channel estimating method with respect to the subcarriers included in subchannel SC8 that is performed by the channel estimator 37.

Although a multicarrier-signal receiving apparatus in the third embodiment is substantially the same as that shown in FIG. 6, only operations of the controller 35 and the channel estimator 37 differ.

In the case of the resource blocks RB12, RB17, and RB18 each including a particular physical channel (for example, PICH or MBMS) (in the case of FIG. 10B at (a) and (b)), there is difference in phase rotation amounts to be added among the subcarrier groups. The controller 35 instructs the channel estimator 37 to average or linearly interpolate only channel estimation values in the same subcarrier group similarly to FIGS. 7 and 8. In the case of the resource blocks RB11, RB13 to RB16, and RB19 each including no particular physical channel (for example, PICH or MBMS) (in the case of FIG. 10C at (a) and (b)), there is no difference in phase rotation amounts to be added among subcarrier groups. The controller 35 instructs the channel estimator 37 to average or linearly interpolate channel estimation values in multiple subcarrier groups.

In other words, the controller 35 in the third embodiment controls the channel estimator 37 based on a physical channel included in the resource block.

The channel estimator 37 calculates a channel estimation value of each subcarrier using a calculation method according to the instruction from the controller 35.

Characteristics that channel responses greatly vary among subcarrier groups in the case of the resource blocks each including a particular physical channel and therefore having phase rotation amount differences among subcarrier groups, and that channel responses hardly vary among subcarrier groups in the case of the resource blocks each including no particular physical channel and therefore having no phase rotation amount difference among subcarrier groups are used. Thereby, channel estimation errors with respect to each subcarrier are suppressed, and channel estimation can be precisely performed. At this time, high frequency-selectivity is enabled in the resource block having a difference in phase rotation amounts to be added among subcarrier groups.

A case where each resource block has a difference in phase rotation amounts to be added by the multicarrier-signal transmitting apparatus among subcarrier groups or has no difference according to the type of a physical channel included therein has been shown. However, another case can be considered where each resource block, even if the same physical channel is included therein, has a difference in phase rotation amounts to be added by the multicarrier-signal transmitting apparatus among subcarrier groups or has no difference according to the type of a transport channel included therein. The transport channel is a channel defined by EUTRA (Evolved Universal Terrestrial Radio Access) of 3GPP (3rd Generation Partnership Project), which is provided from a physical layer to a MAC (Media Access Control) sublayer. There are multiple types of transport channels to transmit data of different properties or different transmission modes over a physical layer. Different transport channels are transmitted over the same physical channel in some cases. It can be considered that, for example, SDCH (Shared Data Channel) which is one type of physical channel includes various transport channels, such as SCH (Downlink Shared Channel) which is a downlink common channel and used for transmitting packet data, and MCH (Multicast Channel) that is a downlink broadcast channel. In this case, it is considered that there is a difference in phase rotation amounts to be added by the multicarrier-signal transmitting apparatus among subcarrier groups or no difference according to the type of the transport channels.

In the case of the resource block including a particular transport channel, the controller 35 assumes that there is a difference in phase rotation amounts to be added among subcarrier groups. Then, the controller 35 instructs the channel estimator 37 to average or linearly interpolate only channel estimation values in the same subcarrier group as explained in FIGS. 7 and 8. In the case of the resource block including no particular transport channel, the controller 35 assumes that there is no difference in phase rotation amounts to be added among subcarrier groups. Then, the controller 35 instructs the channel estimator 37 to average or linearly interpolate channel estimation values in multiple subcarrier groups.

Similarly, another case can be considered where there is a difference in phase rotation amounts to be added by the multicarrier-signal transmitting apparatus among subcarrier groups according to the type of logical channels even if a physical channel and a transport channel are included equally.

In this case, the controller 35 assumes that there is a difference in phase rotation amounts to be added among subcarrier groups in the case of the resource block including a particular logical channel. Then, the controller 35 instructs the channel estimator 37 to average or linearly interpolate only channel estimation values in the same subcarrier group as explained in FIGS. 7 and 8. In the case of the resource block including no particular logical channel, the controller 35 assumes that there is no difference in phase rotation amounts to be added among subcarrier groups. Then, the controller 35 instructs the channel estimator 37 to average or linearly interpolate channel estimation values in multiple subcarriers. The logical channel is a channel defined by EUTRA of 3GPP, provided by MAC, and determined by the type of information to be transmitted.

The channel-estimation symbol generators 11-1 to 11-24, the data mappers 12-1 to 12-24, the multiplexers 13-1 to 13-24, the rotators 14-1 and 14-24, and the IFFT units 15-1 and 15-2 that are shown in FIG. 1, and the FFT unit 34, the controller 35, the channel compensator 36, the channel estimator 37, and the subchannel extractor 38 that are shown in FIG. 6 may be implemented by dedicated hardware, memories, or microprocessors.

Although it has been explained in the first to the third embodiments that a subcarrier group includes adjacent subcarriers, the subcarrier group may include subcarriers that are not arranged adjacent to one another. For example, a subcarrier group may include subcarriers separated from one another by one subcarrier or two carriers, or include multiple pairs of subcarriers, each pair of which is separated from one another by two subcarriers. When a subcarrier group includes 6 subcarriers separated from one another by one subcarrier, each phase rotation amount set by the rotation-amount setting unit 20a is output to the complex multipliers that add phase rotations to the subcarriers that are included in each subcarrier group and separated from one another by one subcarrier. In other words, the complex multipliers receiving the phase rotation amount W1a are the complex multipliers 21-1a, 21-3a, 21-5a, 21-7a, 21-9a, and 21-11a.

Although embodiments of the present invention have been explained in detail with reference to the accompanying drawings, the specific configuration is not limited to these embodiments, and various modifications can be made without departing from the scope of the present invention.

INDUSTRIAL APPLICABILITY

The present invention is preferably used for a multicarrier-signal transmitting apparatus and a multicarrier-signal receiving apparatus for cellular phones and base stations thereof, but not limited thereto.

The invention claimed is:

1. A multicarrier-signal transmitting apparatus comprising:
a rotation-amount setting unit configured to set a phase rotation amount for each subcarrier of a plurality of subcarrier groups, wherein
the phase rotation amount being set with a setting selected from at least two settings,
a first setting of the at least two settings being that the phase rotation amount is set for a first subcarrier group set which includes a plurality of continuous subcarrier groups, the first subcarrier group sets being in the plurality of subcarrier groups,
a second setting of the at least two settings being that the phase rotation amount is set for a second subcarrier group set which includes a plurality of continuous subcarrier groups, the second subcarrier group sets being in the plurality of subcarrier groups, and
the number of the continuous subcarrier groups included in the first subcarrier group set is different from the number of the continuous subcarrier groups included in the second subcarrier group set; and
a phase rotator configured to add, based on the phase rotation amount, a phase rotation to reference signals and a data signal of the each subcarrier of the plurality of subcarrier groups.

2. The multicarrier-signal transmitting apparatus according to claim 1, wherein
the rotation-amount setting unit is further configured to determine the phase rotation amount based on types of physical channels, transport channels or logical.

3. A multicarrier-signal transmitting method comprising:
setting a phase rotation amount for each subcarrier of a plurality of subcarrier groups, wherein
the phase rotation amount being set with a setting selected from at least two settings,
a first setting of the at least two settings being that the phase rotation amount is set for a first subcarrier group set which includes a plurality of continuous subcarrier groups, the first subcarrier group sets being in the plurality of subcarrier groups,
a second setting of the at least two settings being that the phase rotation amount is set for a second subcarrier group set which includes a plurality of continuous subcarrier groups, the second subcarrier group sets being in the plurality of subcarrier groups, and
the number of the continuous subcarrier groups included in the first subcarrier group set is different from the number of the continuous subcarrier groups included in the second subcarrier group set; and
adding, based on the phase rotation amount, a phase rotation to reference signals and a data signal of the each subcarrier of the plurality of subcarrier groups.

4. The multicarrier-signal transmitting method according to claim 3, further comprising:
determining the phase rotation amount based on types of physical channels, transport channels or logical.

5. A non-transitory computer-readable medium having instructions stored thereon, such that when the instructions are read and executed by a processor, the processor is configured to perform the steps of:
setting a phase rotation amount for each subcarrier of a plurality of subcarrier groups, wherein
the phase rotation amount being set with a setting selected from at least two settings,
a first setting of the at least two settings being that the phase rotation amount is set for a first subcarrier group set which includes a plurality of continuous subcarrier groups, the first subcarrier group sets being in the plurality of subcarrier groups,
a second setting of the at least two settings being that the phase rotation amount is set for a second subcarrier group set which includes a plurality of continuous subcarrier groups, the second subcarrier group sets being in the plurality of subcarrier groups, and
the number of the continuous subcarrier groups included in the first subcarrier group set is different from the number of the continuous subcarrier groups included in the second subcarrier group set; and
adding, based on the phase rotation amount, a phase rotation to reference signals and a data signal of the each subcarrier of the plurality of subcarrier groups.

6. The non-transitory computer-readable medium according to claim 5, further comprising:
determining the phase rotation amount based on types of physical channels, transport channels or logical.

* * * * *